United States Patent [19]

Sauvion et al.

[11] Patent Number: 4,908,199
[45] Date of Patent: Mar. 13, 1990

[54] CO+H₂O CATALYTIC CONVERSIONS

[75] Inventors: Guy-Noöl Sauvion, Chevilly Larue; Jack Caillod, Taverny, both of France

[73] Assignee: Pro-Catalyse, Rueil Malmaison, France

[21] Appl. No.: 268,380

[22] Filed: Nov. 7, 1988

Related U.S. Application Data

[62] Division of Ser. No. 38,000, Apr. 14, 1987, which is a division of Ser. No. 813,822, Dec. 27, 1985, abandoned.

[30] Foreign Application Priority Data

Dec. 28, 1984 [FR] France .................. 84 19974

[51] Int. Cl.⁴ .................................... C01B 31/20
[52] U.S. Cl. ..................... 423/437; 423/230; 423/655; 423/656
[58] Field of Search ............. 423/437, 655, 656, 23 C

[56] References Cited

U.S. PATENT DOCUMENTS

| | | | |
|---|---|---|---|
| 1,889,672 | 11/1932 | Larson | 423/656 |
| 3,508,873 | 4/1970 | Taylor | 423/437 |
| 3,850,840 | 11/1974 | Aldridge et al. | 423/655 |
| 3,850,841 | 11/1974 | Aldridge et al. | 423/655 |
| 3,904,386 | 11/1975 | Graboski et al. | 423/656 |
| 3,957,962 | 5/1976 | Ramsbotham | 423/656 |
| 4,233,180 | 11/1980 | Hausberger et al. | 423/656 |
| 4,351,742 | 9/1982 | Deuser et al. | 423/655 |
| 4,432,960 | 2/1984 | Herrington et al. | 423/655 |
| 4,629,612 | 12/1986 | van der Wal et al. | 423/656 |

*Primary Examiner*—John Doll
*Assistant Examiner*—Robert M. Kunemund
*Attorney, Agent, or Firm*—Burns, Doane, Swecker & Mathis

[57] ABSTRACT

Carbon monoxide is reacted with water vapor and converted into hydrogen and carbon dioxide, in the presence of a thio-resistant catalyst which comprises an active phase deposited onto a support, said active phase comprising molybdenum, vanadium or tungsten, and a cobalt and/or nickel promoter therefor, and said support comprising cerium oxide or zirconium oxide. The reaction mixture advantageously includes carbon monoxide, hydrogen, water and compounds of sulfur, wherefrom hydrogen is selectively produced in increased amounts.

9 Claims, No Drawings

CO+H₂O CATALYTIC CONVERSIONS

This application is a divisional of application Ser. No. 07/038,000, filed Apr. 14, 1987, pending which is a divisional of Ser. No. 06/813,822 filed on Dec. 27, 1985, now abandoned.

BACKGROUND OF THE INVENTION

1. Field of the Invention

The present invention relates to the catalytic conversion of carbon monoxide into carbon dioxide and hydrogen, and, more especially, to catalytically converting the CO content of gaseous admixtures thereof into $H_2$ and $CO_2$ by treating same with water vapor in the presence of a catalyst which is resistant to the action of sulfur, or "thio-resistant".

2. Description of the Prior Art

It is known to this art to react carbon monoxide with water vapor, essentially for purposes of hydrogen production. This conversion may be carried out in the presence of a suitable catalyst, specifically by the following reaction mechanism:

$$CO + H_2O \rightleftharpoons H_2 + CO_2$$

Different catalysts have been proposed for this purpose, but it has been found that these catalysts are far from satisfactory, both in view of their activity and their stability over time.

Thus, according to published French Application No. 2,011,150, catalysts based on molybdenum and/or cobalt, and optionally the alkali metals, deposited onto an alumina support, have been proposed for the aforesaid conversion reaction, but without avoiding the aforenoted disadvantages.

SUMMARY OF THE INVENTION

Accordingly, a major object of the present invention is the provision of an improved process for converting carbon monoxide, principally into hydrogen, by reacting same with water vapor in the presence of a highly thio-resistant catalyst, and which improved process is characterized by excellent results in terms of both CO conversion and selectivity in respect of the hydrogen produced.

Briefly, the present invention features the conversion of carbon monoxide into hydrogen, notably the CO content of gaseous admixtures thereof which include hydrogen, water and various sulfur compounds, by reacting same with water vapor, advantageously at a temperature of from 200° to 350° C. and at a pressure of from 5 to 140 bars, in the presence of a thio-resistant catalyst comprising an active metallic phase including molybdenum, vanadium or tungsten, and a cobalt and/or nickel promoter therefor, and said active metallic phase being deposited onto a cerium oxide or zirconium oxide support therefor.

DETAILED DESCRIPTION OF THE INVENTION

More particularly according to the present invention, the productivity of the subject process in terms of the hydrogen produced is markedly superior to that obtained by the known processes, primarily by reason of the fact that the thio-resistant catalyst comprises a cerium oxide or zirconium oxide support.

In a preferred embodiment of the invention, the reaction is carried out at a space velocity of from about 100 to 10,000 hr⁻¹ utilizing a molar ratio of water/carbon monoxide of from 0.5 to 1.5. The gas treated according to the invention may, for example, also contain hydrogen; in particular it may emanate from the steam gasification of coal.

According to another embodiment of the invention, the reaction is carried out at a space velocity of 4,750 hr⁻¹ utilizing a molar ratio of water/carbon monoxide equal to 1, under a pressure of 30 bars and at a temperature of from 250° to 300° C., preferably 275° C.

According to the invention, the catalyst for carrying out the subject process can be represented by the formula XYZ, wherein X represents molybdenum, vanadium or tungsten, Y represents cobalt and/or nickel and Z represents cerium oxide or zirconium oxide, and further wherein it has the following characteristics:

(i) a specific BET surface of the $CeO_2$ or $ZrO_2$ support greater than 10 m²/g, (ii) a total pore volume of from about 0.15 to 0.5 cm³/g, (iii) a packed density ranging from about 0.5 to 2.5, (iv) an atomic ratio of the metal X to the cerium or zirconium of about 1/50 to ¼, and (v) an atomic ratio of the activity promoting metal Y (cobalt and/or nickel) to the metal X of between 0 and 1.

In a preferred embodiment, the specific BET surface of the aforedescribed catalyst is equal to 50 m²/g, its total pore volume is from 0.3 to 0.4 cm³/g, its packed density is from 1 to 2, the atomic ratio X/cerium or zirconium is from 1/20 to 1/7, and the atomic Y/X ratio ranges from 0.1 to 0.5.

The catalyst of the invention is prepared by methods well known to this art and in particular by the dry impregnation of the cerium oxide or zirconium oxide support:

(a) either by ammonium heptamolybdate and cobalt nitrate solutions, or any other precursor of molybdenum or cobalt.

(b) or by ammonium heptamolybdate and nickel nitrate solutions, or any other precursor of molybdenum or nickel.

(c) or by ammonium heptamolybdate, cobalt nitrate and nickel nitrate solutions, or any other precursor of molybdenum, nickel or cobalt.

In another embodiment of the invention, the ammonium heptamolybdate may be replaced by ammonium metavanadate or ammonium metatungstate, or any other precursor of vanadium or tungsten.

In order to further illustrate the present invention, and the advantages thereof, the following specific examples are given, it being understood that same are intended only as illustrative and in nowise limitative.

EXAMPLE 1

(Prior Art Catalyst)

Preparation of a Co/Mo/Al₂O₃ catalyst

The support consisted of gamma-alumina having the following characteristics:

(i) its packed density was 0.64,
(ii) its pore volume was 0.57 cm³g⁻¹,
(iii) its specific BET surface was 250 m²g⁻¹.

The support was used in the form of an extrudate having a diameter of 1.2 mm.

100 cm³ of this support were impregnated in a pill coating machine, at room temperature, with 36.5 cm³ of a solution containing 13.5 g ammonium heptamolybdate.

The material obtained was dried at 150° C. for 16 hr, then calcined at 350° C. for 1 hr. The product was then impregnated in a pill coating machine with 25.7 cm$^3$ of a solution containing 9.1 g cobalt nitrate, then dried at 150° C. for 16 hr and finally calcined at 520° C. for 5 hr.

The catalyst prepared in this manner contained 9.3% Mo and 2.1% Co by weight with respect to the alumina support (Co/Mo=0.37) and had the following characteristics:
(i) Packed density of 0.71,
(ii) Pore volume of 0.45 cm$^3$g$^{-1}$,
(iii) Specific BET surface of 161 m$^2$g$^{-1}$.

EXAMPLE 2

(Catalyst of the Invention)

Preparation of a Co/Mo/CeO$_2$ catalyst by impregnation of cerium oxide with ammonium heptamolybdate and cobalt nitrate (0.9% Co and 3.6% Mo by weight) (Co/Mo=0.41)

The support consisted of cerium oxide, CeO$_2$, having the following properties:
(i) Packed density of 1.71,
(ii) Pore volume of 0.17 cm$^3$g$^{-1}$,
(iii) Specific BET surface of 68 m$^2$g$^{-1}$.

The support was in the crushed form having an average particle size of 1 to 2 mm.

100 cm$^3$ of the support were impregnated in a pill coating machine with 29.0 cm$^3$ of a solution of cobalt nitrate containing 7.8 g of the salt. The product was dried at 150° C. for 16 hr and then calcined at 550° C. for 2 hr.

The catalyst obtained had the following properties:
(i) Packed density of 1.92,
(ii) Pore volume of 0.11 cm$^3$g$^{-1}$,
(iii) Specific BET surface of 39 m$^2$g$^{-1}$.

EXAMPLE 3

(Catalyst of the Invention)

Preparation of a Ni/Mo/CeO$_2$ catalyst by successive impregnation of cerium oxide with ammonium heptamolybdate and nickel nitrate (1.1% Ni and 3.6% Mo by weight) (Ni/Mo=0.50)

The support was identical to that of Example 2.

100 cm$^3$ of this support were impregnated in a pill coating machine with 20 cm$^3$ of a solution of ammonium heptamolybdate containing 11.6 g of the salt. The preparation obtained was dried at 150° C. for 16 hr, then calcined at 550° C. for 0.5 hr.

The product prepared in this manner was impregnated in a pill coating machine with 23.9 cm$^3$ of a solution of nickel nitrate containing 9.5 g of the salt. The product was dried at 150° C. for 16 hr, then calcined at 550° C. for 2 hr.

The catalyst obtained had the following properties:
(i) Packed density of 1.95,
(ii) Pore volume of 0.11 cm$^3$g$^{-1}$,
(iii) Specific BET surface of 37 m$^2$g$^{-1}$.

EXAMPLE 4

(Catalyst of the Invention)

Preparation of a Co/Mo/ZrO$_2$ catalyst by impregnation of zirconium oxide with ammonium heptamolybdate and cobalt nitrate (1.5% Co and 8.3% Mo by weight)

The support consisted of zirconium oxide, ZrO$_2$, having the following characteristics:
(i) Packed density of 1.34,
(ii) Pore volume of 0.17 cm$^3$g$^{-1}$,
(iii) Specific BET surface of 80 m$^2$g$^{-1}$.

The support was in the crushed form having an average particle size of from 2 to 3 mm.

100 cm$^3$ of the support were impregnated twice in a pill coating machine with 45.6 cm$^3$ of a solution of ammonium heptamolybdate containing 20.6 g of the salt. The preparation obtained was dried at 150° C. for 16 hr, then calcined at 550° C. for 0.5 hr.

The product prepared in this manner was impregnated in a pill coating machine with 22.8 cm$^3$ of a solution of cobalt nitrate containing 10.2 g of the salt. The product was dried at 150° C. for 16 hr, then calcined at 550° C. for 2 hr.

The catalyst obtained had the following properties:
(i) Packed density of 1.54,
(ii) Pore volume of 0.15 cm$^3$g$^{-1}$,
(iii) Specific BET surface of 52 m$^2$g$^{-1}$.

EXAMPLE 5

(Catalyst of the Invention)

Preparation of a Ni/Mo/ZrO$_2$ catalyst by successive impregnations of zirconium oxide with ammonium heptamolybdate and nickel nitrate (1.7% Ni and 8.3% Mo by weight)

The support was identical to that described in Example 4.

100 cm$^3$ of the support were impregnated twice in a pill coating machine with 45.6 cm$^3$ of a solution of ammonium heptamolybdate containing 20.6 g of the salt. The preparation obtained was dried at 150° C. for 16 hr, then calcined at 550° C. for 0.5 hr.

The product prepared in this manner was impregnated in a pill coating machine with 22.8 cm$^3$ of a solution of nickel nitrate containing 12.6 g of the salt. The product was dried at 150° C. for 16 hr, then calcined at 550° C. for 2 hr.

The catalyst obtained had the following properties:
(i) Packed density of 1.57,
(ii) Pore volume of 0.14 cm$^3$g$^{-1}$,
(iii) Specific BET surface of 50 m$^2$g$^{-1}$.

CATALYST TEST

The catalyst test, which compared the performance of each of the aforedescribed catalysts in terms of activity and selectivity in respect of hydrogen production, consisted of contacting each of the catalysts with a mixture of reagents containing 37.5% by volume of CO (carbon monoxide), 37.0% by volume H$_2$, 25% by volume H$_2$O and 0.5% by volume H$_2$S.

The reaction was carried out at a space velocity of 4750 hr$^{-1}$, under a pressure of 30 bars and at a temperature of from 250° to 350° C., following a presulfuration treatment of the catalysts at 350° C. for 6 hr under a flow of 10 liters/hr of a mixture of 1.3% of H$_2$S in hydrogen.

Following the separation of the water by means of a condenser, the outlet gases were analyzed by gaseous phase chromatography, whereby the CO, $CO_2$, $CH_4$, $C_2H_6$ and $C_3H_8$ values were determined.

The analysis made it possible to calculate, on the one hand, the conversion $t_{CO}$ of the carbon monoxide (%), defined by the ratio:

$t_{CO}$ = [(moles of CO consumed)/(moles of CO introduced)] × 100 and, on the other, the selectivity $S_X$ in $CO_2$ and $C_nH_{2n+2}$ (%), defined by the ratio:

$S_X$ = [(moles of X formed)/(moles of CO consumed)] × 100

The tables below report the results obtained using the aforesaid catalysts:

TABLE I
CATALYST OF THE PRIOR ART
Co/Mo/Al₂O₃

| Temperature (°C.) | $t_{CO}$% | $S_{CO_2}$% | $S_{C_nH_{2n+2}}$% |
|---|---|---|---|
| 250 | 52.5 | 99.8 | 0.2 |
| 275 | 55.5 | 99 | 1.0 |
| 300 | 55.9 | 98.1 | 1.9 |
| 325 | 56.1 | 97.9 | 2.1 |
| 350 | 58.3 | 90.8 | 9.2 |

TABLE II
CATALYST OF THE INVENTION
Co/Mo/CeO₂

| Temperature (°C.) | $t_{CO}$% | $S_{CO_2}$% | $S_{C_nH_{2n+2}}$% |
|---|---|---|---|
| 250 | 64.3 | 100 | 0 |
| 275 | 67.6 | 100 | 0 |
| 300 | 69.0 | 99.8 | 0.2 |
| 325 | 70.3 | 99.2 | 0.8 |
| 350 | 74.0 | 97.0 | 3.0 |

TABLE III
CATALYST OF THE INVENTION
Ni/Mo/CeO₂

| Temperature (°C.) | $t_{CO}$% | $S_{CO_2}$% | $S_{C_nH_{2n+2}}$% |
|---|---|---|---|
| 250 | 65.7 | 100 | 0 |
| 275 | 69.1 | 100 | 0 |
| 300 | 69.2 | 99.7 | 0.3 |
| 325 | 70.4 | 99.1 | 0.9 |
| 350 | 73.9 | 96.7 | 3.3 |

TABLE IV
CATALYST OF THE INVENTION
Co/Mo/ZrO₂

| Temperature (°C.) | $t_{CO}$% | $S_{CO_2}$% | $S_{C_nH_{2n+2}}$% |
|---|---|---|---|
| 250 | 61.5 | 100 | 0 |
| 275 | 68.5 | 99.9 | 0.1 |
| 300 | 70.2 | 99.7 | 0.3 |

TABLE V
CATALYST OF THE INVENTION
Mo/Ni/ZrO₂

| Temperature (°C.) | $t_{CO}$% | $S_{CO_2}$% | $S_{C_nH_{2n+2}}$% |
|---|---|---|---|
| 250 | 62.5 | 100 | 0 |
| 275 | 68.9 | 100 | 0 |
| 300 | 72.6 | 99.6 | 0.4 |

An examination of the results reported in the foregoing tables evidenced the markedly superior results obtained by using the representative catalysts of the invention described in Examples 2 to 5.

In a general manner, the results given in the tables clearly show the superiority of the catalysts according to the invention in relation to the catalysts of the prior art concerning the amount of carbon monoxide converted.

The invention therefore provides a process for the conversion of carbon monoxide by water vapor, making it possible to recover large amounts of hydrogen, by using a catalyst based on cerium oxide or zirconium oxide, which is particularly stable and which effectively resists the adverse effects of sulfur compounds such as $H_2S$, COS, $CS_2$, $CH_3S$, and the like, the content of which may exceed 4 molar %.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the conversion of carbon monoxide and water into hydrogen and carbon dioxide, comprising reacting carbon monoxide with water vapor in the presence of a catalytically effective amount of thio-resistant catalyst which comprises an active phase deposited onto a support, said active phase consisting essentially of molybdenum, and a cobalt and/or nickel promoter therefor, and said support comprising cerium oxide.

2. The process as defined by claim 1, wherein said reaction is carried out at a space velocity of from about 100 to 10,000 hr$^{-1}$ utilizing a molar ratio, water/carbon monoxide, of from about 0.5 to 1.5.

3. The process as defined by claim 1, wherein said reaction is carried out at a temperature of from about 200° to 350° C. and under a pressure of from about 5 to 140 bars.

4. The process as defined by claim 1, wherein the reaction mixture comprises carbon monoxide, water vapor, hydrogen and compounds of sulfur.

5. The process as defined by claim 4, wherein said compounds of sulfur comprise at least one of $H_2S$, COS, $CS_2$ and $CH_3S$.

6. The process as defined by claim 1, wherein said reaction is carried out at a space velocity of about 4,750 hr$^{-1}$ utilizing a molar ratio, water/carbon monoxide, of about 1, a temperature of about 275° C. and a pressure of about 30 bars.

7. The process as defined by claim 1, said catalyst having the formula XYZ, wherein X is molybdenum, Y is cobalt and/or nickel, and Z is cerium oxide, and wherein the BET specific surface of Z is greater than about 10 m²/g, the atomic ratio of Y to X is between 0 and 1, the atomic ratio of X to the cerium ranges from about 1/50 to ¼, and said catalyst having a total pore volume of from about 0.15 to 0.5 cm³/g and a packed density of from about 0.5 to 2.5.

8. The process as defined by claim 7, said BET specific surface being about 50 m²/g, said atomic ratio Y/X ranging from about 0.1 to 0.5, said atomic ratio X/cerium ranging from about 1/20 to 1/7, said total pore volume ranging from about 0.3 to 0.4 cm³/g, and said packed density ranging from about 1 to 2.

9. The process as defined by claim 1, wherein said reaction mixture emanates from the steam gasification of coal.

* * * * *